W. N. SPRINGER.
STEAM PLOW.
APPLICATION FILED MAR. 8, 1906.
1,209,897.
Patented Dec. 26, 1916.
4 SHEETS—SHEET 3.
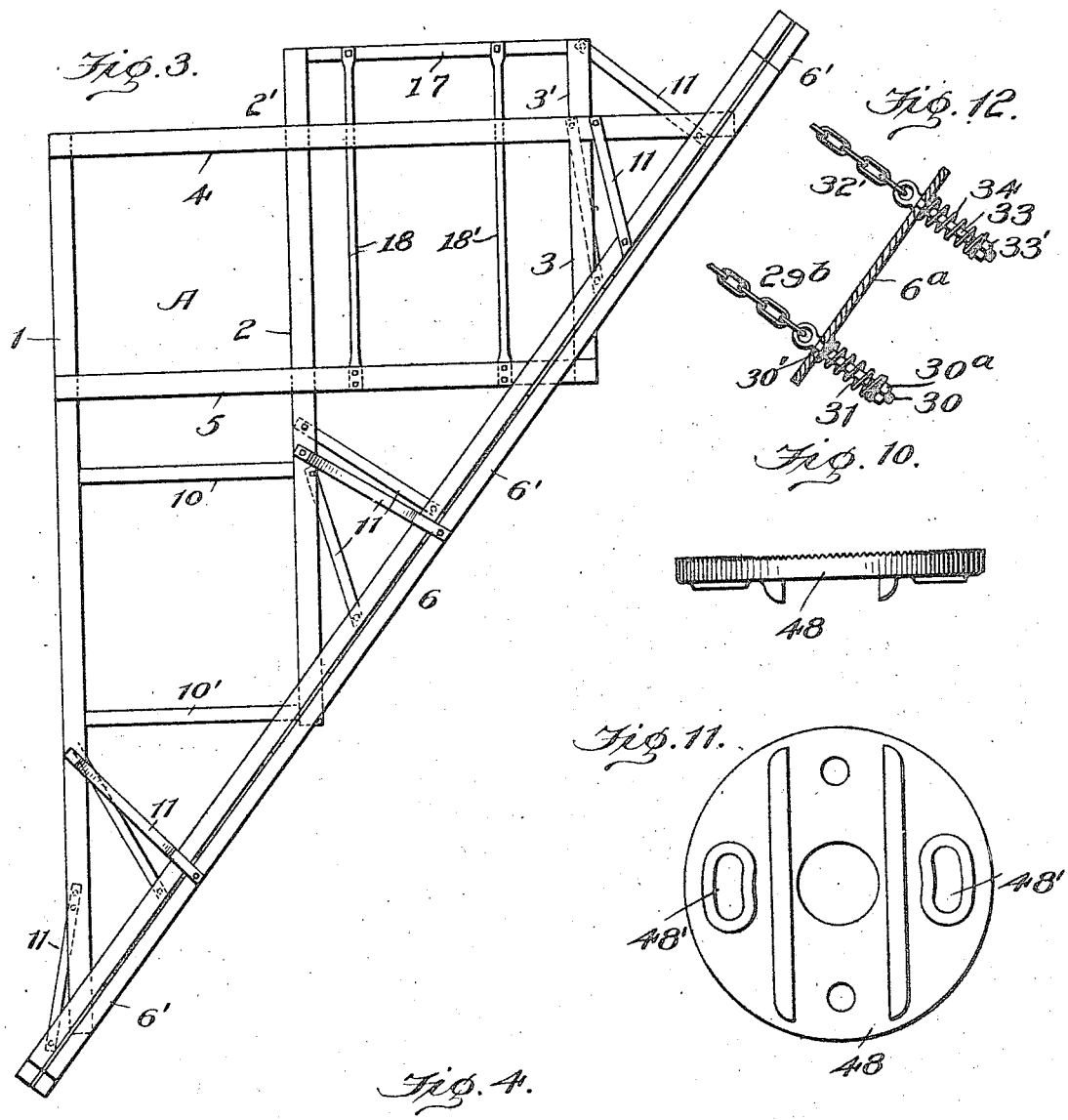
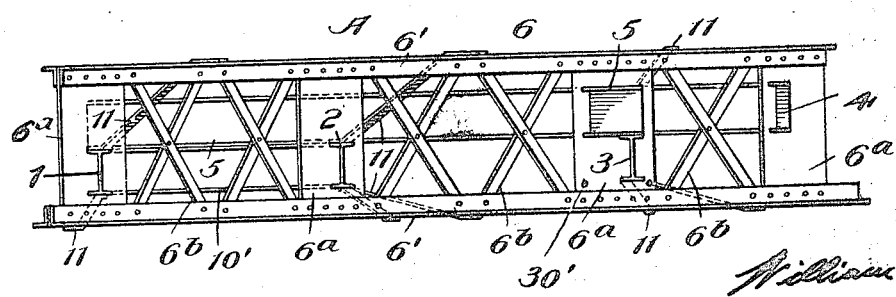

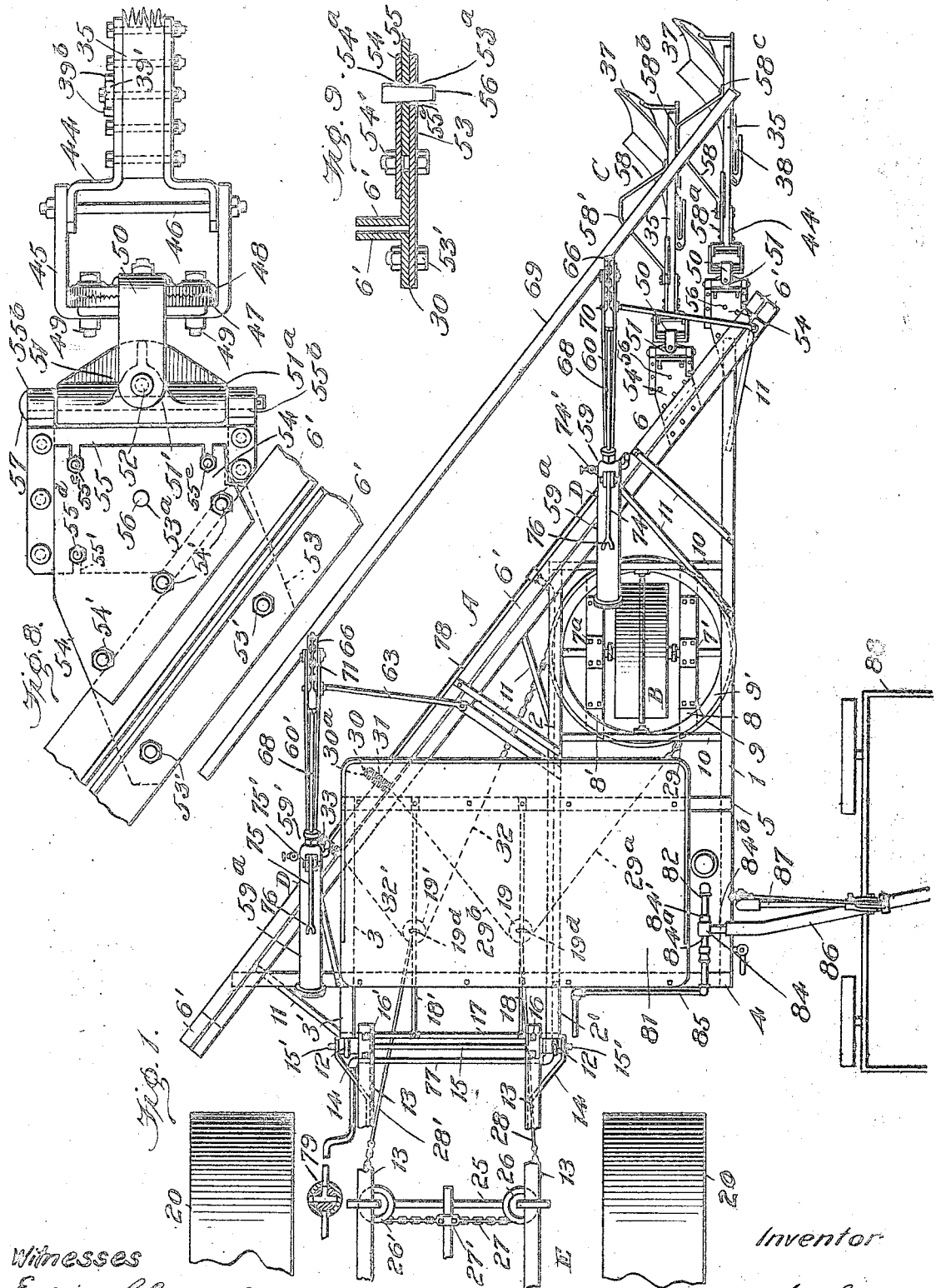

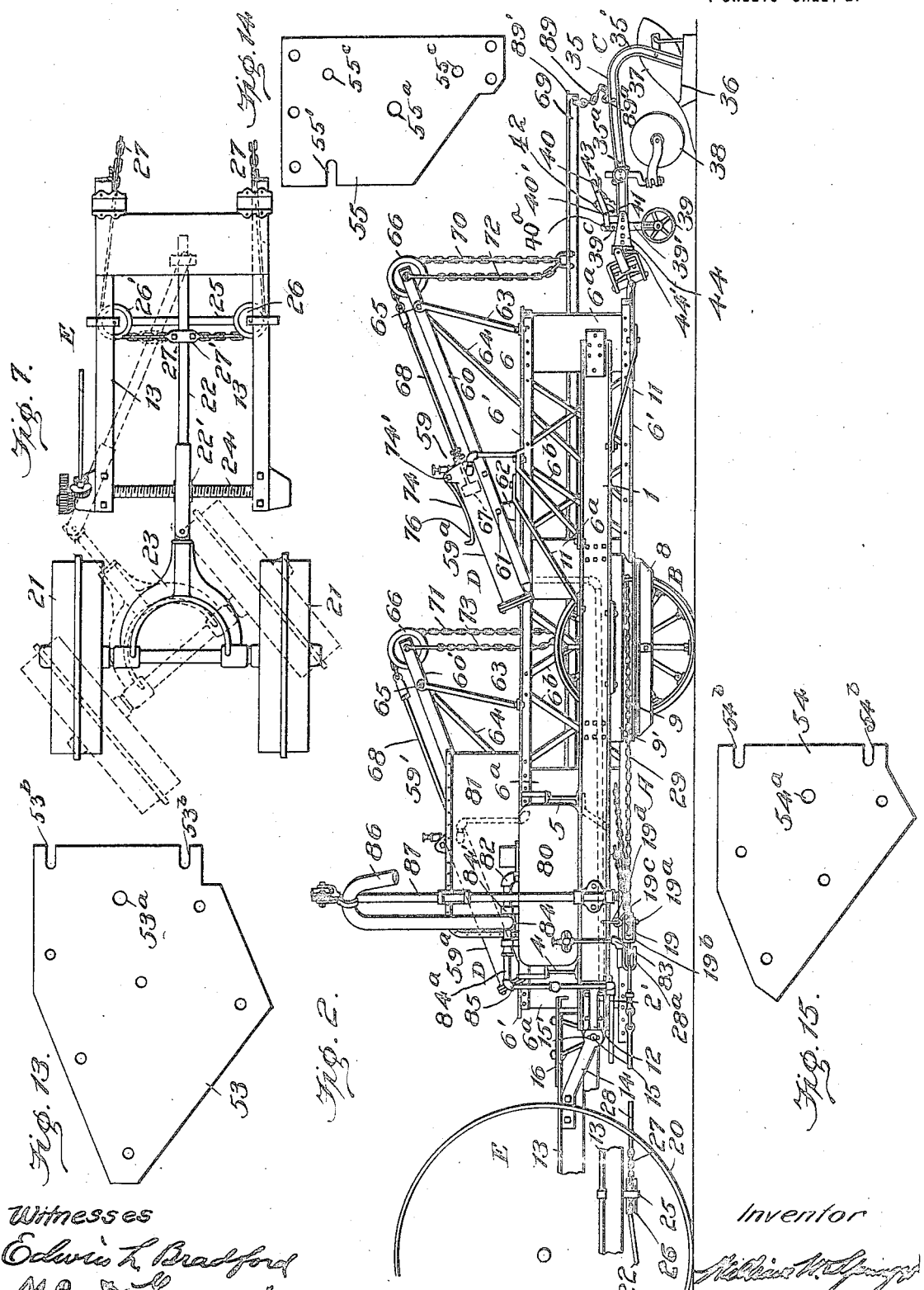

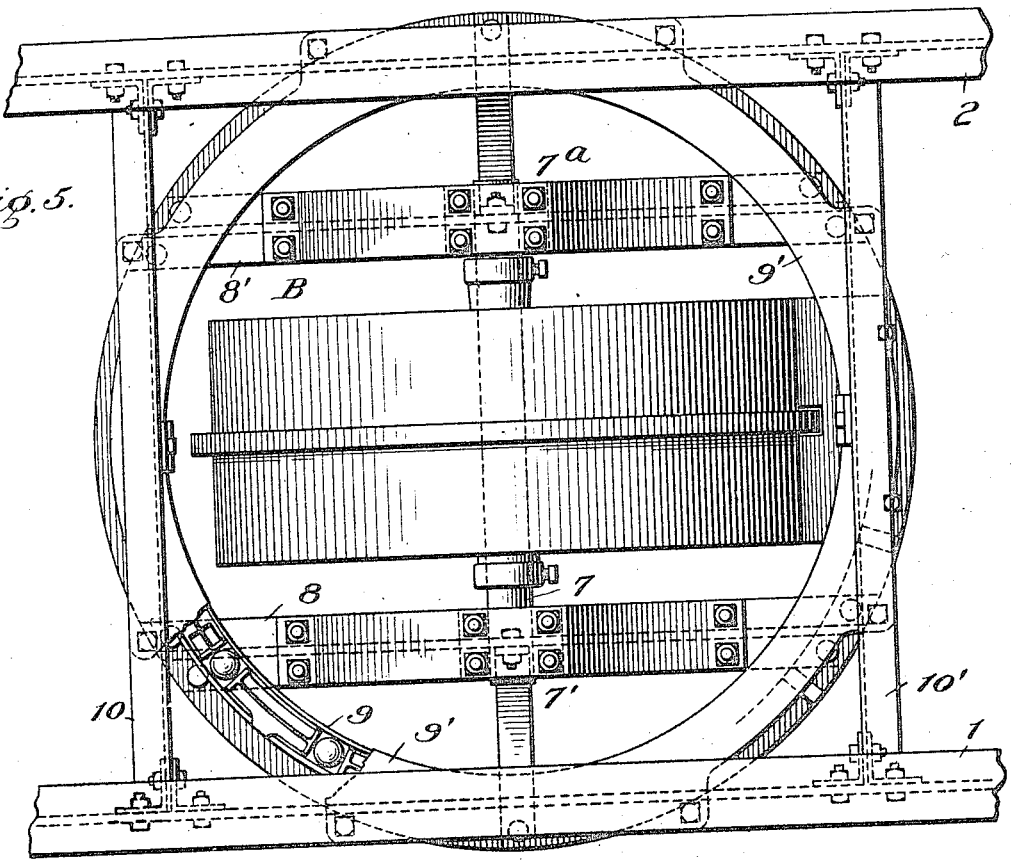
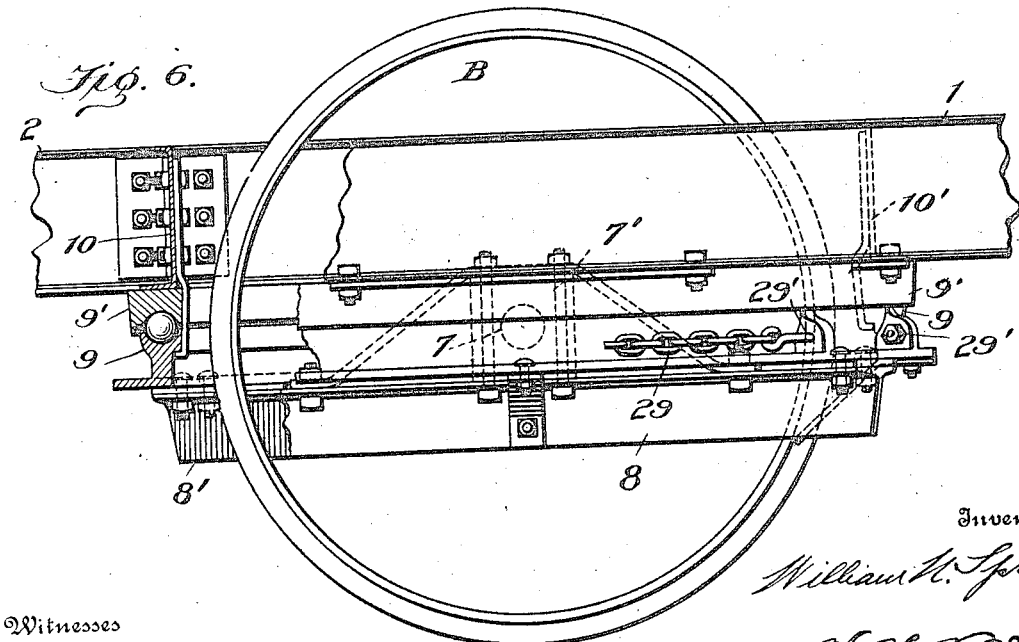

UNITED STATES PATENT OFFICE.

WILLIAM N. SPRINGER, OF PEORIA, ILLINOIS, ASSIGNOR, BY MESNE ASSIGNMENTS, TO AVERY COMPANY, A CORPORATION OF ILLINOIS.

STEAM-PLOW.

1,209,897.	Specification of Letters Patent.	Patented Dec. 26, 1916.

Application filed March 8, 1906. Serial No. 304,855.

*To all whom it may concern:*

Be it known that I, WILLIAM N. SPRINGER, a citizen of the United States, residing at Peoria, in the county of Peoria and State of Illinois, have invented certain new and useful Improvements in Steam-Plows, of which the following is a specification, reference being had therein to the accompanying drawing.

This invention relates to improvements in steam plows, it pertaining particularly to the class of plows known as gang-plows.

One object of the invention is to produce a gang plow adapted to be propelled by a suitable tractor, such as an ordinary traction engine, and to provide a main frame for the plow so supported and so connected to the tractor that the parts of said frame to which the individual plows are connected will be maintained at as uniform a distance from the ground as possible.

A further object is to provide in a plow of this character a rigid main frame so supported from the ground and so connected to the tractor as to swing in unison with the tractor frame, together with individual plows having universally flexible connections with said main frame to permit of such swinging of the main frame without interfering with the uniform operation of the plows.

A further object is to provide in connection with the main frame improved means for taking on and holding a supply of water which may be drawn upon to replenish the supply of water in the boiler of a tractor to which the plow may be attached.

Other objects of the invention will be disclosed through the description of a mechanism which I have herein shown for the purposes of illustrating it.

Figure 1 is a top plan view of a steam plow embodying my improvements, a portion of a traction engine to which it is connected also being shown. Fig. 2 is a side elevation of the same. Fig. 3 is a plan view of the gang-plow frame. Fig. 4 is a rear end view of the same. Fig. 5 shows the steering wheel for the gang-plow frame and its mounting detached. Fig. 6 is a side elevation of the steering wheel and frame parts, shown in Fig. 5, a portion of the frame and bearing structure being broken away and shown in section. Fig. 7 is a diagrammatic view of a part of the steering mechanism for controlling said wheel which is arranged both on the tractor and the gang-plow frame. Fig. 8 is an enlarged plan of the connection or joint between the plow beam of the gang-plow frame and the plow beam of each individual plow. Fig. 9 is a vertical section through a portion of the joint shown in Fig. 8. Figs. 10 and 11 are edge and face views, respectively, of one of the adjusting plates of the plow connection. Fig. 12 is an enlarged detail view of the anchors or fastening devices of the steering chains; and Figs. 13, 14 and 15 show details of parts of the plow connection shown in Fig. 8.

In the drawings, A indicates as an entirety, the frame-work of the gang-plow, B the steering wheel upon which it is mounted, C the gang of plows connected thereto, and D the motors carried by the said frame and arranged to control the elevation from and lowering to working position of the plows.

E indicates the tractor in the form of a traction engine of which only portions of the front steering wheels and steering mechanism, the rear traction wheels, and the frame are shown.

The frame A of the gang-plow is preferably triangular in shape and comprises longitudinally arranged horizontal beams or bars 1, 2, and 3, transverse beams or bars 4 and 5 supported on said longitudinal bars, and a diagonally arranged I-beam or gang-plow-beam 6. All of these beams are rigidly secured together in any suitable and well known manner. The gang-plow-beam 6 is preferably, for the sake of lightness and consistent strength, a skeleton beam built up of angle plates 6', 6' at top and bottom, connected at intervals by plates 6ª and suitable braces 6ᵇ.

The steering wheel B is arranged in a supplemental frame in the angle between the longitudinal beam 1 and the diagonal gang-plow-beam 6, in such manner as to be on the left hand side of the frame and near the rear end thereof. The wheel is rigidly secured to an axle 7 mounted transversely in the bearings 7', 7ª, carried by the beams 8, 8', respectively, which also carry the lower ball race 9 of the ball bearing, the upper ball race 9' of which is carried by the transverse bars 10, 10' secured in position between the longitudinal beams 1 and 2.

11 are supporting and bracing rods, each connected at one end to the gang-plow-beam 6 either at the top or bottom thereof, and at its other end to one of the longitudinal beams of the frame correspondingly either at the top or bottom thereof.

The longitudinal beams 2 and 3 preferably extend forward beyond the top transverse beam 4, as indicated at 2', 3', respectively, and at their front ends carry bearing or pivot blocks 12, 12, which serve as part of the means by which the gang-plow-frame is connected to the tractor frame. The latter is indicated by 13, and as shown, when the frames are connected together overlaps the front end of the gang-plow-frame.

14, 14, are connection brackets secured at their front ends to the tractor frame and having their rear ends adapted to lie adjacent to the bearing blocks, 12, 12.

15 is a rod or shaft extending through the rear ends of said connection brackets and the bearing blocks 12, 12, and held in position by pins 15', 15' at either end, which may be suitably locked to prevent their detachment except when desired.

16, 16', are suitable hangers or supports for the shaft 15 suspended from the rear end of the tractor frame.

17 is a bar or rod connecting the beams 2 and 3 together near their front ends.

18, 18', are rods or bars, each secured at its rear end to the under surface of the I-beam 5 and at its front end to the cross bar 17.

19, 19', are horizontally arranged guide sheaves mounted on pivot pins 19$^a$ carried by the swinging arms 19$^b$. The pivot pins at their upper ends carry eyes 19$^c$ which are suspended by links 19$^d$ from the rods 18 and 18', the said links permitting longitudinal movement of the sheaves 19, 19' relative to their respective supporting rods 18, 18'. The sheave frames 19$^b$ are connected to the steering mechanism for the steering wheels of the tractor in any suitable manner according to the nature of the said mechanism. For illustration, I have shown the tractor E as having the traction wheels 20, 20, supporting the rear end of the engine frame 13, and the steering wheels 21, 21, supporting the front end thereof. These steering wheels are turned in either direction about a pivotal point central between them by means of a swinging rod 22 pivotally connected to a yoke 23 connected with the steering axle. The swinging bar 22 may be caused to swing in both directions between certain limits by means of a threaded connection 22' with a power-driven screw rod 24, this particular steering mechanism being set forth and described in detail in my Patent No. 842,589, dated January 29, 1907.

25 is a cross bar connected at either end to the adjacent frame bar of the tractor.

26, 26' are horizontally arranged sheaves pivotally connected to and supported by said cross bar 25.

27 is a steering chain extending around and guided by the sheaves 26, 26', and connected at 27' with the swinging bar 22 of the steering mechanism for the steering wheels of the tractor.

28, 28' are rods each connected at its forward end to the adjacent end of the chain 27 and at their rear end by universal joints 28$^a$ to the adjacent sheave-carrying frames 19$^b$.

29 is a steering chain or cable for positively rotating the steering wheel B of the gang-plow-frame in both directions. This chain extends around the said wheel and is rigidly secured at 29' to the rotatable frame which carries the wheel. From the left side of this frame the chain extends in a line as indicated at 29$^a$, to the guide sheave 19 around which it is carried and from which it extends in a line 29$^b$. Its end is secured to one end of a bolt 30 which is free to move through an aperture 30' in one of the vertical connecting plates of the diagonal gang-plow-beam 6.

31 is a spring encircling said bolt and interposed between the said plate and a nut 30$^a$ adjustable along the bolt. From the opposite side of the rotatable steering wheel-carrying frame the chain extends along a line 32 to the guide sheave 19' around which it is directed and from which it extends along the line 32' to a bolt 33, to one end of which it is connected and which is likewise supported in one of the connecting plates in the I-beam 6 and is free to move laterally therethrough.

34 is a spring encircling said bolt and interposed between said plate and a nut 33' adjustable along said bolt. Each plow of the gang C is identical in all particulars with the others and is similarly connected to the gang beam 6 of the rigid triangular frame, and therefore it will only be necessary to describe one of them and its means of connection to the frame.

35 indicates the plow beam of each individual plow. It has the downwardly turned part 35' to which a suitable plow share 36 and mold board 37 are secured. The forward extending arm 35$^a$ of the said plow beam has adjustably secured to it a rolling or revolving colter 38 and at its front end carries a vertically adjustable ground and gage wheel 39, this wheel, when the plow is in working position, serving to bear upon the ground and support the front end of the plow beam 35 in such manner as to determine the depth at which the plow share 36 will operate. The wheel 39 is pivoted to one side of a vertically adjustable rod 39' which is held and guided between suitable guides or lugs 39$^b$, 39$^b$ secured to the front end of the plow beam. At its upper end this arm 39' has a longitudinal row of holes 39ᶜ.

40 is an adjusting lever pivotally mounted at 40' to an upright projection or lug 41 carried by the plow beam. At its forward end this lever 40 is pivotally connected to the upper end of the bar 39' by a pin 40ᵃ extending through it and one of the holes 39ᶜ in the upper end of the said bar.

42 is a toothed locking segment carried at one side of the projection or lug 41, and 43 is a spring-controlled locking pawl arranged to engage with the teeth of said segment, and to hold the lever arm 40 in various positions of adjustment. By connecting the lever arm 40 with the wheel-carrying arm 39' through the different holes 39ᶜ therein, a wide range of adjustment for the wheel 39 is obtained.

44 is a yoke rigidly secured to the front end of the plow beam 35. It is pivotally connected to a yoke or U-shaped bar 45 by a horizontally disposed transverse pivot 46, which pivot may be inserted through the various alined holes 44', arranged in a vertical series along the arms of the yoke 44, in order to vary the relation of the connection between the said yoke and the said U-shaped bar 45.

47 is a plate or disk rigidly secured to the said bar 45 between its rearwardly extending arms. The rear face of this plate is provided with a series of radially arranged teeth.

48 is a disk or plate provided with a corresponding series of radially arranged teeth adapted to register with the teeth of the plate 47. This plate 48 at diametrically opposite points is provided with curvilinear passageways 48' through which bolts 49 extend which are adapted to bind the plates 47 and 48 together, these curvilinear passageways serving to permit the adjustment of the plate 48 relative to the plate 47.

50 is a vertically arranged U-shaped plate rigidly secured to the disk or plate 48 and having its horizontal arms extending forward.

51 is a universal joint-member or element having a vertically arranged portion 51' and a horizontally arranged portion 51ᵃ.

52 is a pivot pin or bolt pivotally connecting the vertical part 51' of the said member between the arms of the U-shaped bar 50.

53, 54, are horizontally arranged plates rigidly secured to the bottom 30 of the gang-plow-beam 6 by bolts 53', 54'. In the rear of said beam they are spaced apart to receive a connecting or coupling plate 55 which is inserted between them and clamped between them by means of bolts extending between said plates.

56 is a pin made of wood or some suitable material which will break under considerably less strain than will any of the metal parts of the plow or its connections. This pin is inserted through vertically alined holes 53ᵃ, 54ᵃ in the plates 53 and 54 and a hole 55ᵃ in the connecting or coupling plate 55. At its rear end each of the plates 53 and 54 is notched at either side thereof as indicated at 53ᵇ, 53ᵇ. The upper plate 54 of the said connecting means overlaps the bottom flange of the diagonal beam 6 and is connected to the plate 53 by means of the bolts 54'. This plate at its rear end is notched at 54ᵇ, 54ᵇ, so that the walls of said notches will aline with the walls of the notches 53ᵇ in the plate 53. The intermediate plate 55 at its front end is notched as indicated at 55' to receive the shank of the bolt 55ᵈ which passes through all of the plates and is adapted to bind them together.

55ᵉ, 55ᵉ, are bolts, the shanks of which pass through apertures 55ᶜ, 55ᶜ, in the plate 55 and are adapted to enter the alined notches 53ᵇ and 54ᵇ in the lower and upper plates respectively, they also serving to bind the plates together. It will be seen that if the tension between the plates of the connecting device exceeds a predetermined amount, the pin 56 will break and the plate 55 will be pulled out from between the upper and lower plates. Lateral motion of the plates relative to each other while they are connected together is prevented by the engagement of the walls of the various notches in the different plates with the shanks of the bolts therein. The coupling plate 55 carries arms or projections 55ᵇ which extend beyond the rear edge of the plate and are adapted to receive between them the horizontal element 51ᵃ of the universal joint member 51.

57 is a coupling pin or pivot connecting the said part 51ᵃ with the said projections or arms 55ᵇ.

58 are spacing frames each carried by one of the plow beams and interposed between it and the next adjacent plow beam to the right of it. These frames may consist, as shown, simply of a bar of metal 58' secured at 58ᵃ to the plow beam and extending across to and bearing against the adjacent plow beam at 58ᵇ and then returning and being secured to the first plow beam as indicated at 58ᶜ. As each one of these spacing devices is secured only to one of the plow beams, it will be seen that they will in nowise prevent the substantially independent operation of the plows.

The lifting and the lowering mechanism D for the gang of plows preferably consists of two simple single acting steam engines 59, 59' arranged near either end of the gang plow-beam 6. Each of these lifting and lowering devices comprises a steam cylinder 59ᵃ arranged longitudinally of the gang-plow-frame and rigidly secured in inclined position on top of the I-beam 6.

These engines 59, 59' are preferably carried by inclined beams 60, 60', respectively, each of these inclined beams being connected near its lower end as indicated at 61 to an upwardly extending plate or projection 62 which is rigidly secured to the upper surface of the said gang-plow-beam 6. And each is rigidly supported in position near its upper end by supporting bars or rods 63, 64, connected at their upper ends to the said inclined bar by a bolt or pin 65. The support 63 is secured at its lower end to the upper surface of the I-beam 6, and the support 64 is connected at its lower end to the same beam near the bottom thereof.

66 are vertically arranged guide sheaves pivotally mounted at the rear ends of the inclined bars 60, 60'.

67 are pistons arranged to reciprocate within the cylinders 59ª, 59ª, and 68 are piston rods controlled by said pistons.

69 is a floating beam from which the plows of the gang are suspended when in elevated position. This floating beam is arranged parallel to the gang-plow-beam 6.

70, 71, are chains respectively connecting the rear ends of the piston rods 68 to the said floating beam, and 72, 73, are chains connecting the rear end of the inclined beams 60, 60' to the said floating beam 69, respectively. The chains 70 and 71 serve to transmit power for the elevating of the said floating beam and to control its lowering into working position, and the chains 72 and 73 serve to prevent the lowering of the said floating beam relative to the said inclined beams 60, 60', beyond a predetermined point.

74, 75, are locking bars pivotally connected at 74', 75', respectively, to the upper surfaces of the cylinders 59ª and each carrying at its outer end a forked portion 76, the arms of which are arranged to engage with the links of the chains 70 and 71 in order to lock or hold the floating beam 69 in elevated position.

The motive fluid for actuating and controlling the movements of the pistons 67 within their respective cylinders is preferably taken from the source of motive fluid supply for the tractor. For illustration, I have shown a supply pipe 77 connected to a pipe 78 which extends between the cylinders 59ª, 59ª, and which is in communication at either end with the interior of the adjacent cylinder.

The supply pipe 77 may be provided with a three-way valve 79 adapted both to place said pipe in communication with the source of motive fluid supply and also with the external air, and by this simple means motive fluid can be introduced into the cylinders for forcing the pistons forward therein and elevating the plows, and when it is desired to lower the plows motive fluid can also be introduced into the cylinders in such manner as to relieve the strain on the lock-bars 74, 75, which may then be readily released, and the plows may then be lowered, the travel of the pistons being cushioned by the motive fluid within the cylinders, the valve 79 being turned to cut off the supply of motive fluid and then to gradually and slowly permit the escape of that in the cylinders to the outside air. However, any well known means for introducing motive fluid to a simple lifting piston of the type shown and then cushioning the return of the piston within the cylinder may be employed.

80 is a water tank secured in position upon the plow frame and adapted to carry water for the tractor.

81 is a fuel box likewise suitably secured upon the plow frame and adapted to carry fuel for the tractor.

82 is an inlet pipe for conducting water into the water tank 80 and 83 is an outlet pipe for drawing it off to the tractor. I have found it highly desirable to provide some means for filling the water tank 80 with water while the plow frame is traveling along in operation. To this end, the inlet pipe 82 is connected to one arm 84' of a T-coupling 84, the other arm 84ª of which, in alinement with the arm 84', is connected to a steam supply pipe or jet 85 communicating with a steam supply line on the tractor. The arm 84ᵇ is connected with a flexible hose 86 supported and carried by a swinging frame or crane 87 in such manner that the free end of the hose may be inserted in a water tank or a water cart indicated by 88, and as the cart moves along parallel with the plow frame, water may be drawn from the tank thereon into the tank 80. The steam jet 85 will direct steam into the arm 84' of the coupling 84 in such way as to create a suction or siphonic action in the hose 86.

Each individual plow beam 35 is connected to the floating beam 69 by a chain or cable 89 connected at 89' to the latter beam and at 89ª to the former beam, in such manner that when the floating beam has been elevated a predetermined distance above the ground, these chains or cables become taut and then cause the suspension above the ground of their respective plows.

The operation of the mechanism will be readily understood. When the plow frame is connected to the tractor frame by the coupling pivot or rod 15 and the steering rods 28, 28 are connected to the sheave frames 19ᵇ, 19ᵇ, if power is applied for driving the tractor, the triangular plow frame will move with it wherever it goes, and in accordance with the turning or the steering of the steering wheels of the tractor the rods 28, 28 will act upon the steering chain 29 for the steering wheel B of the plow frame in such manner as to cause the said frame to track properly behind the tractor. For example, referring to Fig. 7, if the steering wheels are turned so as to cause the tractor to turn to the right, the rod 28 on the right hand side of the tractor will exert a pull on the chain 29 so as to turn the axle of the steering wheel B in anti-clockwise direction, and this will cause the plow frame to follow in the path of the tractor. If the steering wheels are turned so as to cause the tractor to turn to the left, the steering wheel B will be turned in clockwise direction to make the plow frame track properly. The springs 31 and 34 provide the necessary resiliency in the steering mechanism between the tractor and the plow frame to prevent unnecessary straining of the chains, rods, and connections, and to take up any sudden jerks or shocks imparted either from the steering wheels of the tractor or the steering wheel and supporting wheel B of the plow frame.

The raising and lowering of the gang of plows will be readily understood and does not need further description. It will be noted that the gang-plow-beam 6 carries at or near its bottom the connections or couplings between it and each individual plow, and that on its top it supports the cylinders and various parts of the lifting and lowering mechanism.

The connection between the main plow beam 6 and the plow beam 35 of each individual plow being a universal one, by adjusting the plates 47 and 48 relative to each other and the U-shaped bar 45 relative to the yoke 44, it is possible to rapidly and readily connect up and maintain the connection between the said beams in the relationship desired.

The transverse pivots at 46 and 51$^a$ permit the vertical play of each individual plow both relative to the plow frame and to the other plows of the gang, while the vertical pivots at 51' permit the desired lateral play of each individual plow. The gage wheels 39 are carried by and are adjustable for each individual plow and are so mounted as to be quickly and readily adjusted to regulate the depth of plowing of their respective plows.

With the rigid plow frame connected at two widely separated points to the tractor frame and with the plow frame supported by the swiveling steering wheel, it is clear that the said frame will swing bodily with the tractor frame. Thus the driver or engineer can by means of the tractor steering wheel accurately guide the plow frame. Furthermore, since each plow has a universal connection with the main frame, the latter can be swung to one side or the other in guiding it without interfering with the even and uniform action of the several plows, because the universal connections permit the individual plows to readily change their lines of draft as the plow frame is swung more or less to one side or the other.

It will be observed that the universal connections which I have provided not only permit the plows to freely swing vertically and laterally with respect to the main frame, but also serve to hold the plows against any angular movements about longitudinal axes. The construction is to be contrasted with the uncertain earlier gang plows in which the individual plows were connected to the frame merely by means of chain links which were ineffective to maintain any definite relationship between the plows and the frame. With my construction each individual plow is held vertical and is therefore enabled to operate freely and efficiently. Furthermore, the spacing means for the plows, combined with the means for holding them vertical, causes the work to be evenly divided among the several plows with the result that the furrows are all uniform.

With the front side of the plow frame pivoted to the rear end of the tractor in the manner set forth, it will, of course, rise and fall slightly with said rear end of the tractor when the latter passes over uneven ground, the plow frame tilting about the horizontal axis of the wheel B. But the effect upon the plows of this tilting of the plow frame is reduced to a minimum by the peculiar arrangement of the wheel B. This wheel is disposed approximately midway between transverse vertical planes through the front and rear ends of the obliquely disposed beam to which the plows are hitched, or, in other words, about midway between the frame connections of the outside plows. Therefore the lifting and depressing of the front ends of the beams of the plows is reduced to a minimum and made as uniform as possible throughout the gang.

I do not herein claim, as a part of this present invention, the steering mechanism for the plow, nor the connections between the plow steering mechanism and the steering mechanism of the tractor. This subject-matter is presented in my co-pending application for coupled vehicles, Serial No. 457,115, filed October 10, 1908, as a division of this application.

What I claim is—

1. The combination with a tractor of a rigid plow frame comprising a beam disposed obliquely to the lines of travel, a series of plows connected to the beam, pivotal connections between the tractor and the front of the plow frame adapted to support the front side of said frame, and a single supporting wheel for said frame disposed approximately midway between transverse vertical planes through the front and rear ends of the said frame beam.

2. The combination with a tractor, of a rigid plow frame comprising a beam disposed obliquely to the lines of travel, a series of plows connected to the said beam, pivotal connections between the tractor and the front of the plow frame adapted to support the front side of said frame and cause it to swing in unison with the tractor when the course of the latter is changed, and a single supporting wheel for the frame disposed approximately midway between transverse vertical planes through the front and rear ends of the said frame beam and mounted to swing about an upright axis.

3. The combination with a tractor, of a rigid plow frame comprising a beam disposed obliquely to the lines of travel, a series of plows each having a universal connection with said frame beam, pivotal connections between the tractor and the front of the plow frame adapted to support the front side of said frame and cause it to swing in unison with the tractor when the course of the latter is changed, and a single supporting wheel for the frame disposed approximately midway between transverse vertical planes through the front and rear ends of the said frame beam and mounted to swing about an upright axis.

4. The combination with a tractor, of a rigid plow frame comprising a beam disposed obliquely to the lines of travel, laterally extended two point draft connections between the tractor and frame adapted to cause the frame to swing in unison with the tractor when the course of the latter is changed, means comprising a swiveling wheel for supporting the rear part of the frame, and a series of plows each having a universal connection with the aforesaid beam of the plow frame which permits it to freely swing both vertically in relation to the plow frame and laterally around a single vertical pivot which is fixed relatively to the frame and said connection holding the beam against angular movement about a longitudinal axis.

5. The combination with a tractor, of a rigid plow frame suitably supported from the ground and comprising a beam disposed obliquely to the lines of travel, laterally extended two point draft connections between the tractor and the frame adapted to cause the frame to swing in unison with the tractor when the course of the latter is changed, and a series of plows each having a universal connection with the aforesaid beam of the plow frame which permits it to freely swing both vertically in relation to the plow frame and laterally around a single vertical pivot which is fixed relatively to the frame and said connection holding the beam against angular movement about a longitudinal axis.

6. The combination with a tractor, of a rigid plow frame suitably supported from the ground and comprising a beam disposed obliquely to the lines of travel laterally extended two point draft connections between the tractor and the frame adapted to cause the frame to swing in unison with the tractor when the course of the latter is changed, a series of plows each having a universal connection with the plow frame which permits it to freely swing both vertically in relation to the plow frame and laterally around a single vertical pivot which is fixed relatively to the frame and said connection holding the beam against angular movement about a longitudinal axis, and spacing means carried by the plows and serving to hold them separated without interfering with their free swinging vertically and laterally.

7. The combination with a tractor, of a rigid plow frame suitably supported from the ground and comprising a beam disposed obliquely to the lines of travel, laterally extended two point draft connections between the tractor and the frame adapted to cause the frame to swing in unison with the tractor when the course of the latter is changed, a series of plows each having a universal connection with the plow frame which permits it to freely swing both vertically in relation to the plow frame and laterally around a single vertical pivot fixed relatively to the frame and said connection holding the beam against angular movement about a longitudinal axis, and spacing means carried by each of said plows and extending laterally to loosely engage the adjacent plow so that the plows are free to separate laterally from each other.

In testimony whereof I affix my signature, in presence of two witnesses.

WILLIAM N. SPRINGER.

Witnesses:
    J. B. BARTHOLOMEW,
    R. D. ANDREW.